(12) United States Patent
Vokey

(10) Patent No.: US 6,437,572 B1
(45) Date of Patent: Aug. 20, 2002

(54) INTERACTIVE METHOD AND APPARATUS FOR LOCATING AND IDENTIFYING UTILITIES

(75) Inventor: David E. Vokey, Bellingham, WA (US)

(73) Assignee: Norscan Inc., Conover, NC (US)

( * ) Notice: Subject to any disclaimer, the term of this patent is extended or adjusted under 35 U.S.C. 154(b) by 0 days.

(21) Appl. No.: 09/709,417

(22) Filed: Nov. 13, 2000

(30) Foreign Application Priority Data

Jun. 16, 2000 (CA) .......................................... 2,311,834

(51) Int. Cl.⁷ ............................. G01V 3/12; G01V 3/17; G08C 21/00
(52) U.S. Cl. ......................... 324/326; 324/67; 324/329; 379/25; 455/66
(58) Field of Search ................................ 324/326, 329, 324/67, 528–530; 379/25; 340/551, 572.1, 572.5; 455/40, 66

(56) References Cited

U.S. PATENT DOCUMENTS 4,143,251 A  *  3/1979  Clark ..................... 324/326 X
4,767,237 A     8/1988  Cousman et al.
4,862,088 A  *  8/1989  Etienne et al. ............ 324/67 X
5,430,379 A  *  7/1995  Parkinson et al. ........ 324/67 X
5,844,405 A  * 12/1998  Eslambolchi et al. ......... 324/67
6,133,738 A  * 10/2000  Minarovic .................. 324/326

FOREIGN PATENT DOCUMENTS

EP          0 341 994 A2      11/1989

* cited by examiner

Primary Examiner—Gerard R. Strecker
(74) Attorney, Agent, or Firm—Larson & Taylor, PLC

(57) ABSTRACT

The invention provides an interactive means to locate and identify underground utilities. The apparatus is used with a marker associated with an elongate electrical conductor, which may be a cable shield or a trace wire. It includes a remote, portable probe that is used to transmit a RF signal to be received by a transponder associated with the marker. The transponder is powered by a DC potential on the conductor. In preferred embodiments it has the capability of communicating with a terminal unit over the conductor to transmit information and instructions between the probe and the terminal unit.

24 Claims, 2 Drawing Sheets

INTERACTIVE METHOD AND APPARATUS FOR LOCATING AND IDENTIFYING UTILITIES

FIELD OF THE INVENTION

The present invention relates to the electronic location and identification of markers. It has particular application to markers used for locating and identifying electrical cables.

BACKGROUND

The majority of telephony, cable television (catv) and power cables in urban environments are placed underground in duct structures. This is done for reasons of safety, maintenance and aesthetics. The cost of building the underground duct structures is considerable and, as a matter of economics, utilities often share duct space.

Manholes or utility vaults are an integral part of the underground duct structure. They provide a managed space for joining successive lengths of cable and access points to provide communication and power to urban customers. This often results in several cables from various utilities passing through and being jointed in a common vault.

Plant maintenance and service provisioning require clear and unambiguous identification of the cables and joints placed in common areas. In particular, joint boxes or enclosures need to be precisely identified so that a service technician can easily select and enter a designated enclosure. In general, cable enclosures are of similar designs and it is not uncommon to find the same make of enclosure in use on more than one cable at the same vault location. Furthermore, in high density urban environments cable vaults are often located short distances apart to provide frequent access for local service. This often makes difficult the identification of a specific cable and enclosure.

A means for clearly identifying cables and enclosure is highly desirable. One such method is described in U.S. Pat. No. 5,844,405. This employs an electronic marker which is placed in or on the conveyance to be identified. A handheld marker locator is then placed in close proximity to the marker to radiate a radio frequency (RF) signal to the electronic marker. The marker receives the RF signal, converts it to DC power for the internal circuits of the marker, and radiates a secondary RF response signal. This system is similar to RF tags which are used in various applications from identifying products to electronically tagging pets.

This method has an inherent limitation. The RF marker or tag must receive a signal of sufficient field strength to power up the DC circuitry before the marker can respond. This limits the effective range to a few feet or less and, if the marker is shielded by nearby metal, it may not respond at all. Furthermore, the marker responds only with preprogrammed information and can not receive a command to change a condition or request new information.

The present invention in its various aspects addresses these limitations. In preferred embodiments it provides an interactive means to locate and identify underground utilities.

SUMMARY

According to one aspect of the present invention there is provided an apparatus for identifying a marker associated with an elongate electrical conductor, said apparatus comprising:
  a terminal unit including a power supply for applying electric power to the conductor;
  a probe including a probe transmitter and receiver for selectively transmitting an activation signal and for receiving response signals;
  a transponder associated with the marker and including:
    a transponder receiver for receiving activation signals from the probe,
    a response signal transmitter for transmitting response signals to be received by the probe, and
    a power supply for receiving electric power from the conductor and for delivering the electrical power to the transponder receiver and to the response signal transmitter.

The transponder is thus powered by the terminal unit over the conductor which may be the metallic shield of a cable, a trace wire or any other available conductor. The power available is not limited to what can be transmitted from the probe so that the range and reliability of the apparatus are considerably extended.

It is preferred that the power be a negative DC voltage, which provides cathodic protection for the conductor. This is especially useful where the conductor is a shield of a buried cable.

According to another aspect of the present invention, there is provided an apparatus for identifying a marker, comprising:
  a probe including:
    a probe transmitter for selectively transmitting each of a plurality of probe signals, and
    a probe receiver for receiving response signals;
  a transponder associated with the marker and including:
    a probe signal receiver for receiving probe signals from the probe and
    a response signal transmitter for selectively transmitting each of a plurality of response signals to the probe and
    a processor responsive to receipt of a probe signal by the probe signal receiver to cause the response signal transmitter to transmit a response signal corresponding to the probe signal.

The probe is thus capable of transmitting plural different probe signals to the transponder in order to elicit different responses. This allows the user not only to locate a marker but to identify specific markers and other characteristic information, for example about the marker and the cable or other device with which it is associated.

According to a further aspect of the present invention, there is provided an apparatus for identifying a marker associated with an elongate electrical conductor, comprising:
  a probe including:
    a probe transmitter for selectively transmitting a radio frequency probe signal;
    a probe receiver for receiving radio frequency response signals;
  a transponder associated with the marker and including:
    a radio frequency probe signal receiver for receiving probe signals from the probe;
    a radio frequency transmitter for transmitting radio frequency response signals;
    a low baud rate transponder transmitter for transmitting low baud rate command signals on said conductor;
    a low baud rate transponder receiver for receiving low baud rate response signals from said conductor;
    a processor for converting radio frequency probe signals received by the radio frequency probe signal receiver to low baud rate command signals and causing the low baud rate transponder transmitter to transmit the low baud rate command signals, for converting low baud rate response signals received by the low baud rate transponder receiver to radio frequency response signals and for causing the radio frequency transmitter to transmit the radio frequency response signals.

This provides the user with the ability to query not only the limited information that may be available from the transponder but a much more extensive range of information that can be stored in a terminal unit. Low baud rate signals are used over the conductor to ensure reliability. This is particularly useful where the conductor is a metallic cable shield.

The signal sent to the terminal unit from the transponder may also be used to initiate remote action, for example actuating a remote device. One application is turning on a tone transmitter for cable location purposes.

The low baud rate response signals may include reprogramming code for reprogramming the transponder processor.

BRIEF DESCRIPTION OF THE DRAWINGS

In the accompanying drawings, which illustrate an exemplary embodiment of the present invention.

DETAILED DESCRIPTION

Figure 1:
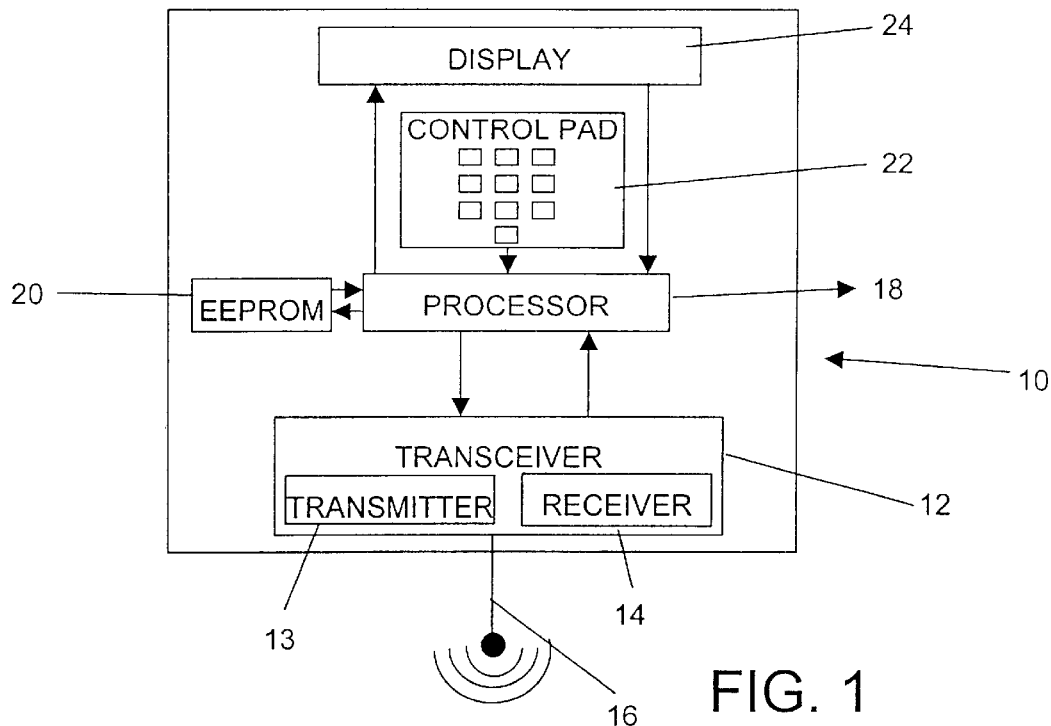
FIG. 1 a schematic illustration of a probe.

Referring to the accompanying drawings, FIG. 1 illustrates a probe 10. This is a portable unit, preferably hand-held, that is transported by a technician to locations where a cable is to be located and identified. The probe includes a radio frequency transceiver 12, which includes a transmitter component 13 and a receiver component 14. The transceiver transmits and receives radio frequency (RF) signals using an antenna 16. The transceiver is coupled to a microprocessor 18 with an electronically erasable programmable read-only memory (EEPROM) 20. This in turn receives manual input from a control pad 22 and delivers an output to a display 24.

The probe provides a user interface for the input of commands and a display for reading information. The microprocessor and the EEPROM control the operation of the probe. The transceiver 12 generates a medium wave radio frequency signal of about 125 KHz and modulates it with a digital command signal sent from the microprocessor according to the contents of the EEPROM and under the control of input from the control pad 22. The modulated radio frequency signal is sent to the probe antenna 16 where it is radiated.

The probe also has a receive mode in which radio frequency signals are received by the antenna 16 and detected, demodulated and amplified by the transceiver 12. The demodulated signal is then sent to the microprocessor 18 for decoding and presentation on the display 24.

Figure 2:
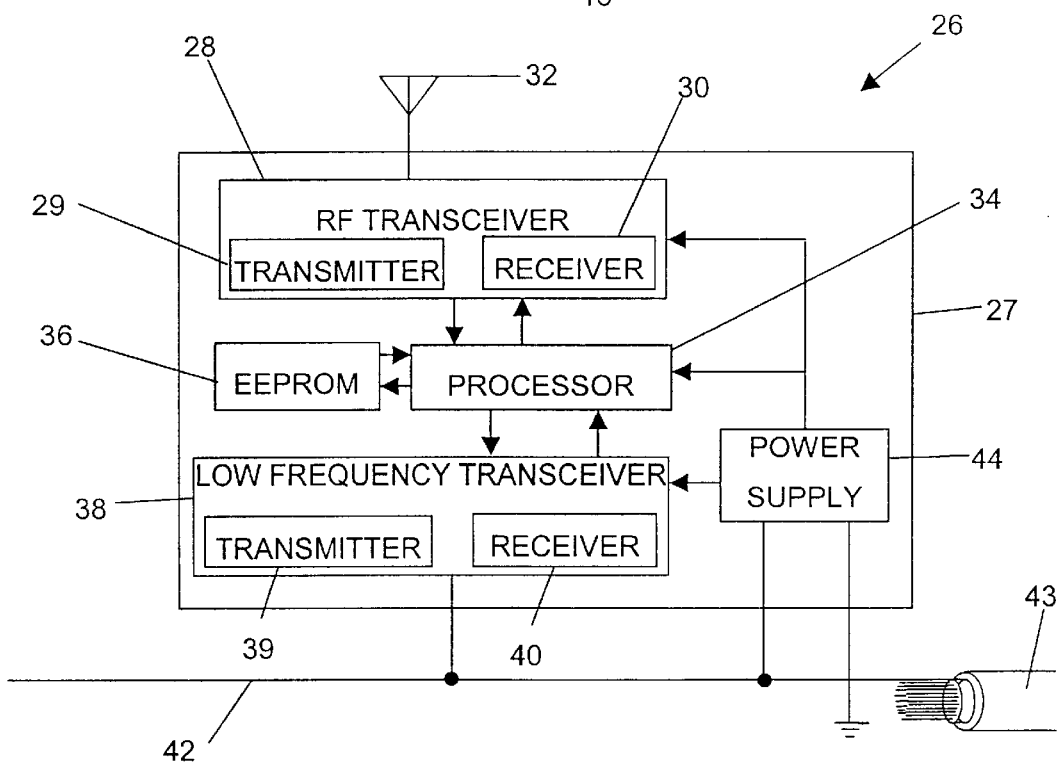
FIG. 2 is a schematic illustration of a transponder.

The second component of the apparatus is the transponder 26 illustrated in FIG. 2. The transponder is associated with a marker 27 of any suitable type. The transponder has a radio frequency transceiver 28 including a RF transmitter component 29 and a RF receiver component 30. The RF transceiver is coupled to an antenna 32 for receiving and transmitting radio frequency signals and to a microprocessor 34 and EEPROM 36 for generating and decoding RF signals transmitted and received. The transponder includes a second low baud rate transceiver 38 including a low baud rate transmitter component 39 and a low baud rate receiver component 40. The low baud rate transceiver transmits and receives signals at a rate of about 3 to 10 baud. This low baud rate ensures long distance transmission over long and lossy conductors. The low baud rate transceiver 38 is connected to a conductor 42 which in this case is the protective metal shield of a cable 43.

The transponder also includes a power supply 44 that is connected to the conductor 42 and to ground. The conductor 42 carries a DC potential of about −48 volts with respect to ground. The power supply 44 regulates the input voltage to around 5 volts DC and powers the transceiver 28, the processor 34, memory 36 and the transceiver 38.

Figure 3:
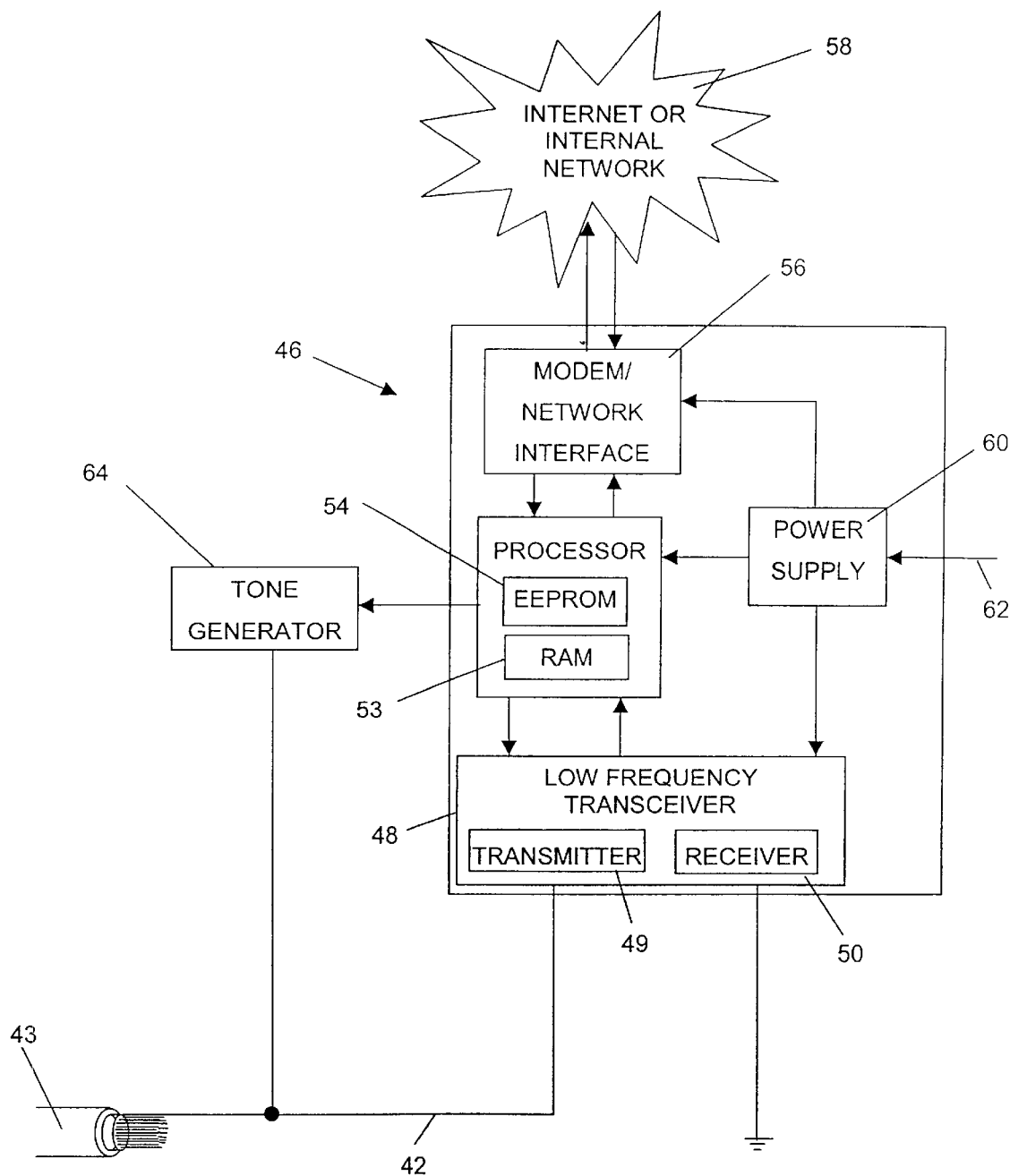
FIG. 3 is a schematic illustration of a terminal unit.

A third component of the apparatus is the terminal unit 46 illustrated in FIG. 3. This is located in an equipment office. The terminal unit includes a low baud rate transceiver 48 with a transmitter component 49 and a receiver component 50. The transceiver is connected to the conductor 42 to receive and transmit signals on the conductor. The terminal unit also includes a processor 52 with random access memory (RAM) 53 and EEPROM 54. The processor 52 is also connected to a modem or other network interface 56 which connects the terminal unit 46 to a network 58, which may be a connection to the internet or some other network. The terminal unit is powered by a power supply 60 connected to the local power service 62. The internal power supply 60 provides DC power for the internal circuits of the terminal unit 46 and also for powering the conductor 42.

Using the probe, a technician can transmit a selected command signal to the transponder. The transponder antenna 32 will intercept the signal from the probe 10 and send it to the transceiver 28 where the signal is amplified and forwarded to the processor 34 for decoding. The command code can be dealt with in two general ways. One class of commands will cause the transponder to read from the EEPROM 36 pre-programmed information, for example enclosure designation number, utility company identification or cable type. The transponder then transmits this data to the probe where it is decoded and presented on the probe display 24. The other class of commands causes the transponder to store the command in memory and then re-transmit the command at a low baud rate over the conductor 42 using the low frequency transceiver 46.

In the terminal unit 46, a signal sent from the transponder 26 is received from the conductor 42 by the transceiver 48 from which it is sent to the processor 52. The signal is decoded by the processor and a response computed. Depending on the instructions, the computer will perform one or more of several tasks. These include:

a) forwarding the information to a remote location via the communication interface 56 to the coupled network 58;

b) requesting new instructions or information from the network 58;

c) carrying out instructions, for example actuating a tone generator 64 for placing a cable locate tone on the conductor 42;

d) forwarding information or instructions from the terminal unit to the transponder.

In forwarding information, the processor sends a response to the low baud rate transceiver 48 which then current modulates the conductor 42. Any response received by the transponder on the conductor 42 is intercepted by the transceiver 38 and sent to the processor 34 for decoding and further action. For example, the data may be sent to the radio frequency transceiver 28 where it modulates a radio frequency signal of about 125 KHz. The modulated signal is then radiated from the antenna 32 for reception by the probe. The data may also be used to reprogram the EEPROM of the transponder.

With this system, the radio frequency transceiver in the transponder 26 is always powered and is actively searching for a probe signal. This provides a high degree of receiver sensitivity as all of the received radio frequency energy is processed as information, none being used to power the transponder.

While one particular embodiment of the present invention has been described in the foregoing, it is to be understood that other embodiments are possible within the scope of the invention. The invention is to be considered limited solely by the scope of the appended claims.

What is claimed is:

1. An apparatus for identifying a marker associated with an elongate electrical conductor said apparatus, comprising:
    a probe including:
        a probe receiver for receiving radio frequency response signals;
    a transponder associated with the marker and including:
        a response signal transmitter for selectively transmitting to the probe each of a plurality of radio frequency response signals representing characteristic information about the marker or the conductor; and
        a processor responsive to receipt of a radio frequency probe signal by the probe signal receiver to cause the response signal transmitter to transmit a radio frequency response signal, the transponder including:
    a transponder processor for converting at least selected radio frequency probe signals received from the probe to low baud rate signals corresponding to the selected probe signals; and
    a low baud rate transmitter for transmitting the low baud rate signals over the conductor.

2. An apparatus according to claim 1 wherein the transponder further includes a low baud rate receiver for receiving low baud rate response signals from the conductor and the transponder processor includes means for converting the low baud rate response signals to radio frequency response signals and causing the response signal transmitter to transmit the radio frequency response signals.

3. An apparatus according to claim 2 wherein the terminal unit includes a terminal unit processor with a memory for recording a plurality of terminal unit response signals, the processor being responsive to receipt of a low baud rate signal to select one of the terminal unit response signals corresponding to the received low baud rate command signal.

4. An apparatus according to claim 3 wherein the transponder includes a programmable memory and at least one of the terminal unit response signals comprises means for programming said programmable memory.

5. An apparatus according to claim 1 including a terminal unit connected to the conductor and including a terminal receiver for receiving low baud rate signals from the conductor and a terminal transmitter for transmitting low baud rate response signals on the conductor.

6. An apparatus according to claim 5 wherein the terminal unit includes means for causing the actuation of a remote device.

7. An apparatus according to claim 6 wherein the remote device is a tone signal generator.

8. An apparatus according to claim 5 wherein the terminal unit includes a communications interface coupled to the processor and to a communications network external to the terminal unit for transmitting data therebetween.

9. An apparatus according to claim 5 wherein:
    the terminal unit includes a power supply for applying electric power to the conductor; and
    a power supply for receiving electric power from the conductor and for delivering the electrical power to the transponder.

10. An apparatus according to claim 9 wherein the electrical power is DC power.

11. An apparatus according to claim 10 wherein the DC power has a negative polarity with respect to ground.

12. An apparatus according to claim 1 wherein the conductor is associated with a communications cable.

13. An apparatus according to claim 12 wherein the conductor is a metallic shield of the cable.

14. An apparatus according to claim 12 wherein the conductor is a trace wire.

15. An apparatus according to claim 1 wherein the probe includes a manual input for selecting a probe signal to be transmitted.

16. An apparatus according to claim 1 wherein the probe includes a display for displaying a response corresponding to a response signal received.

17. An apparatus according to claim 1 wherein the transponder includes a memory for recording a plurality of response signals and the processor is responsive to receipt of a probe signal by the probe signal receiver to select one of the response signals corresponding to the command signal for transmission by the response signal transmitter.

18. An apparatus for identifying a marker associated with an elongate electrical conductor, comprising:
    a probe including:
        a probe transmitter for selectively transmitting a radio frequency probe signal;
        a probe receiver for receiving radio frequency response signals;
    a transponder associated with the marker and including:
        a radio frequency command signal receiver for receiving probe signals from the probe;
        a radio frequency transmitter for transmitting radio frequency response signals;
        a low baud rate transponder transmitter for transmitting low baud rate signals on said conductor;
        a low baud rate transponder receiver for receiving from said conductor the low baud rate response signals transmitted thereon by the low baud rate transponder transmitter;
        a processor for converting radio frequency command signals received by the radio frequency command signal receiver to low baud rate signals and causing the low baud rate transponder transmitter to transmit the low baud rate command signals, for converting low baud rate signals received by the low baud rate transponder receiver to radio frequency response signals and for causing the radio frequency transmitter to transmit the radio frequency response signals.

19. An apparatus according to claim 18 including a terminal unit connected to the conductor and including:
    a terminal receiver for receiving low baud rate signals from the conductor; and
    a terminal transmitter for transmitting low baud rate response signals on the conductor.

20. An apparatus according to claim 19 wherein the terminal unit includes a terminal unit processor with a memory for recording a plurality of terminal unit response signals, the processor being responsive to receipt of a low baud, rate signal to select one of the terminal unit response signals corresponding to the received low baud rate command signal.

21. An apparatus according to claim 20 wherein the transponder includes a programmable memory and at least one of the terminal unit response signals comprises means for programming said programmable memory.

22. An apparatus according to claim 19 wherein the terminal unit includes means for causing the actuation of a remote device.

23. An apparatus according to claim 22 wherein the remote device is a tone signal generator.

24. An apparatus according to claim 19 wherein the terminal unit includes a communications interface coupled to the processor and to a communications network external to the terminal unit for transmitting data therebetween.

* * * * *